United States Patent [19]

Miller

[11] Patent Number: 5,595,797

[45] Date of Patent: *Jan. 21, 1997

[54] PROTECTIVE HOLDERS FOR DISKS

[75] Inventor: William R. Miller, Walnut, Calif.

[73] Assignee: Rembrandt Photo Services, City of Commerce, Calif.

[ * ] Notice: The term of this patent shall not extend beyond the expiration date of Pat. No. 5,595,798.

[21] Appl. No.: 145,253

[22] Filed: Oct. 29, 1993

[51] Int. Cl.$^6$ ............................. B65D 73/00; B65D 85/57
[52] U.S. Cl. ..................... 428/35.2; 428/45; 428/76; 428/192; 428/200; 428/694 R; 428/900; 206/308.1; 206/311; 206/312; 206/456; 206/472; 206/473; 206/474; 206/484.2; 281/38; 402/79; 360/133
[58] Field of Search ................... 428/34.1, 35.2, 428/192, 45, 200, 76, 349, 345, 694 R, 900; 206/472, 473, 474, 484.2, 456, 444, 311, 312, 308.1, 387.1; 40/159, 537, 124.2, 323; 402/79; 281/38; D19/32, 33; D3/227, 253; 369/291; 360/133

[56] References Cited

U.S. PATENT DOCUMENTS

| | | | |
|---|---|---|---|
| D. 240,816 | 8/1976 | Peterson | D19/33 |
| D. 242,960 | 1/1977 | Stanley | D99/34 |
| D. 261,155 | 10/1981 | Nast | D19/33 |
| D. 262,040 | 11/1981 | Wihlke | D19/33 |
| D. 304,478 | 11/1989 | Hanson | D6/629 |
| D. 316,107 | 4/1991 | Lockner | D19/20 |
| D. 316,180 | 4/1991 | Hines | D6/629 |
| D. 318,068 | 7/1991 | Truc et al. | D19/33 |
| D. 325,817 | 5/1992 | Call | D6/626 |
| D. 345,765 | 4/1994 | Fritz | D20/42 |
| D. 353,837 | 12/1994 | Miller | D19/33 |
| 429,752 | 6/1890 | Camp | 229/92.9 |
| 821,019 | 5/1906 | Cooke, Jr. | 229/72 |
| 1,029,836 | 6/1912 | Warne | 229/92.9 |
| 1,168,634 | 1/1916 | Hoffman | 229/1.5 R |
| 1,186,312 | 6/1916 | Hanselmann | 206/311 |
| 1,315,696 | 9/1919 | Alstrand | 229/72 |
| 1,459,457 | 6/1923 | Wilburger | 206/311 |
| 1,563,034 | 11/1924 | Levine | 150/112 |

(List continued on next page.)

FOREIGN PATENT DOCUMENTS

| | | |
|---|---|---|
| 0022973 | 6/1948 | Finland . |
| 0642651 | 9/1928 | France . |
| 1194784 | 11/1959 | France . |
| 0125897 | 5/1919 | United Kingdom . |

OTHER PUBLICATIONS

Specimen of "Ultra Pro" Sports Card Album Page, Manufactured by Rehbrandt Photo Services, California 1990.
Cover Page and pp. 32–33 of 20th Century Plastics Catalog, Jan. 1991, California.
Specimen of double page for "CD Wallet" product Model No. PCD32; Alpha Enterprises Inc. (First Version).
Specimen of double page for "CD Wallet" product Model No. PCD32; Alpha Enterprises, Inc. (Second Version).
Specimen of double page for "CD Preserver" product; Pride Plastics.
Specimen of ProSleeve "CD sleeve"; Case Logic, Inc.

Primary Examiner—Ellis Robinson
Assistant Examiner—Rena L. Dye
Attorney, Agent, or Firm—David Weiss

[57] ABSTRACT

A device for protectively storing collectible disks, in particular a plastic album leaf for protectively storing and displaying collectible disks such as milk caps or coins. The device comprises two flexible plastic panels in superposed relation, and securing means securing the panels in such relation with a first opening between the panels, the securing means including an arcuate seam sealing the superposed panels together along a circular arc for containing at least one-half but not the entirety of the disk between the panels within the arc of the seam, the arc of the seam exceeding 180° and terminating at a second opening between the superposed panels of sufficient width for permitting passage therethrough and into the arc of at least one-half of the disk when the disk is received by the first opening for containing the entirety of the disk between the panels.

28 Claims, 1 Drawing Sheet

U.S. PATENT DOCUMENTS

| | | | |
|---|---|---|---|
| 2,463,450 | 3/1949 | Wisner | 229/68 R |
| 2,500,773 | 3/1950 | Robins | 206/311 |
| 2,881,912 | 4/1959 | Kursh | 206/312 |
| 3,422,952 | 1/1969 | George | 206/313 |
| 3,443,686 | 5/1969 | Raymond | 206/472 |
| 3,446,260 | 5/1969 | Osher | 150/147 |
| 3,473,653 | 10/1969 | Nunes | 206/205 |
| 3,688,898 | 9/1972 | Stanton | 206/311 |
| 3,722,564 | 3/1973 | Croon | 206/311 |
| 3,864,755 | 2/1975 | Hargis | 360/133 |
| 4,043,477 | 8/1977 | Deese | 220/23.4 |
| 4,076,874 | 2/1978 | Giovanelli | 428/35.2 |
| 4,263,357 | 4/1981 | Holson | 428/138 |
| 4,313,298 | 2/1982 | Pecsok et al. | 57/3 |
| 4,327,831 | 5/1982 | Inaba | 206/310 |
| 4,339,034 | 7/1982 | Panveno | 206/313 |
| 4,365,708 | 12/1982 | Tyus | 206/309 |
| 4,447,973 | 5/1984 | Wihlke | 40/159 |
| 4,473,153 | 9/1984 | Colangelo | 206/312 |
| 4,508,366 | 4/1985 | Brindle | 281/36 |
| 4,538,730 | 9/1985 | Wu | 206/444 |
| 4,549,658 | 10/1985 | Seikas | 206/466 |
| 4,566,590 | 1/1986 | Manning et al. | 206/232 |
| 4,610,352 | 9/1986 | Howey et al. | 206/313 |
| 4,620,630 | 11/1986 | Moss | 206/45.24 |
| 4,623,062 | 11/1986 | Chase et al. | 206/311 |
| 4,676,374 | 6/1987 | Wilkins | 206/311 |
| 4,699,268 | 10/1987 | Oishi | 206/313 |
| 4,704,042 | 11/1987 | Eisen et al. | 402/79 |
| 4,709,812 | 12/1987 | Kosterka | 206/310 |
| 4,778,047 | 10/1988 | Lay | 206/311 |
| 4,793,477 | 12/1988 | Manning et al. | 206/232 |
| 4,850,731 | 7/1989 | Youngs | 402/79 |
| 4,971,195 | 11/1990 | Mitsuyama | 206/311 |
| 5,085,318 | 2/1992 | Leverick | 206/312 |
| 5,087,145 | 2/1992 | Cooley | 206/456 |
| 5,154,284 | 10/1992 | Starkey | 206/311 |
| 5,207,717 | 5/1993 | Manning | 206/232 |

PROTECTIVE HOLDERS FOR DISKS

BACKGROUND OF THE INVENTION

This invention relates to devices for protectively storing collectible disks, and more particularly to plastic album leaves for protectively storing and displaying collectible disks such as milk caps or coins.

Disk inserts have been utilized in cap closures for milk bottles, as well as for other containers for holding liquids such as fruit juices. Such disks are generally constructed of a rigid sheet material such as cardboard, are usually decorated or have a message printed thereon, and have become the subject of collection by many persons. In fact, interest in collecting such disks has increased in recent years to the extent that new disks are being designed for distribution directly to collectors. Regardless of their original purpose, these cardboard disks are commonly known as "milk caps", and are sometimes called "pogs" (which is an acronym for the names of certain fruits sold as juices). The dimensions of such collectible milk caps or pogs are generally substantially identical, regardless of their source, commonly having a diameter of approximately 1⅝ inches and a thickness of approximately 3/64 inch.

As with any collectible item, the physical condition of milk caps contribute significantly to their desirability and economic value. The proliferation of milk cap collections has resulted in a need for preserving the milk caps' original condition (or at least to decrease their further deterioration), while permitting their storage in an orderly fashion while also permitting the protected milk caps to be conveniently accessible and their printed surfaces to be viewed. The utilization of prior art devices, such as those designed for holding coins, have been unsuccessful in filling this need.

SUMMARY OF THE INVENTION

The present invention provides a device for protectively storing disks, and in particular collectible milk caps or pogs, while permitting viewability of such disks. Briefly described, the device comprises, in combination, two flexible plastic panels in superposed relation, and securing means securing the panels in such superposed relation with a first opening for receiving the disk between the panels, the securing means including an arcuate seam sealing the superposed panels along a circular arc for containing at least one-half but not the entirety of the disk between the panels within the arc of the seam, the arc of the seam exceeding 180° (and preferably at least approximately 230°) and terminating at a second opening between the superposed panels of sufficient width for permitting passage therethrough and into the arc of at least one-half of the disk when the disk is received by the first opening for containing the entirety of the disk between the panels. The width of the second opening and the inside diameter of the arcuate seam are related to the diameter and the thickness of the disk such that the disk resists withdrawal from within the arc of the seam through the second opening when at least one-half of the disk is contained within the arc.

The preferred embodiment of the device of the present invention is in the form of an album leaf for containing a plurality of disks, such as milk caps, the album leaf comprising, in combination, a first substantially rectangular flexible plastic panel; a plurality of substantially rectangular second flexible plastic panels; and securing means securing the second panels respectively to the first panel in superposed relation with an edge of each second panel providing a first opening between the first panel and the second panel for receiving the disks, the securing means including a plurality of arcuate seams sealing the second panels to the first panel in such superposed relation, each arcuate seam describing a circular arc for containing at least one-half but not the entirety of a one of the disks between the first panel and a one of the superposed second panels within the arc of the seam, the arc of the seam exceeding 180° (preferably being approximately 230°) and terminating at a second opening between the first panel and the one superposed second panel, the second opening having a width for permitting passage therethrough and into the arc of at least one-half of the one disk when the one disk is received by the first opening between the first panel and the one superposed second panel for containing the entirety of the one disk between the first panel and the one superposed panel. With respect to each of the arcuate seams, the width of the second opening and the inside diameter of the arcuate seam are related to the diameter and thickness of the one disk such that the one disk resists withdrawal from within the arc of the seam through the second opening when at least one-half of the disk is contained within the arc.

When a disk is fully inserted into the device through the first and a second opening, the disk is self-positioning with respect to the arcuate seam and, although only partially contained within the arcuate seam, is completely contained between the two plastic panels. Although the device permits the disk to be easily withdrawn from between the two plastic panels by hand, the device causes resistance to accidental withdrawal of the disk from between the two panels.

BRIEF DESCRIPTION OF THE DRAWINGS

The novel features which are believed to be characteristic of the invention, together with further advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DESCRIPTION OF THE PREFERRED EMBODIMENT

Figure 1:
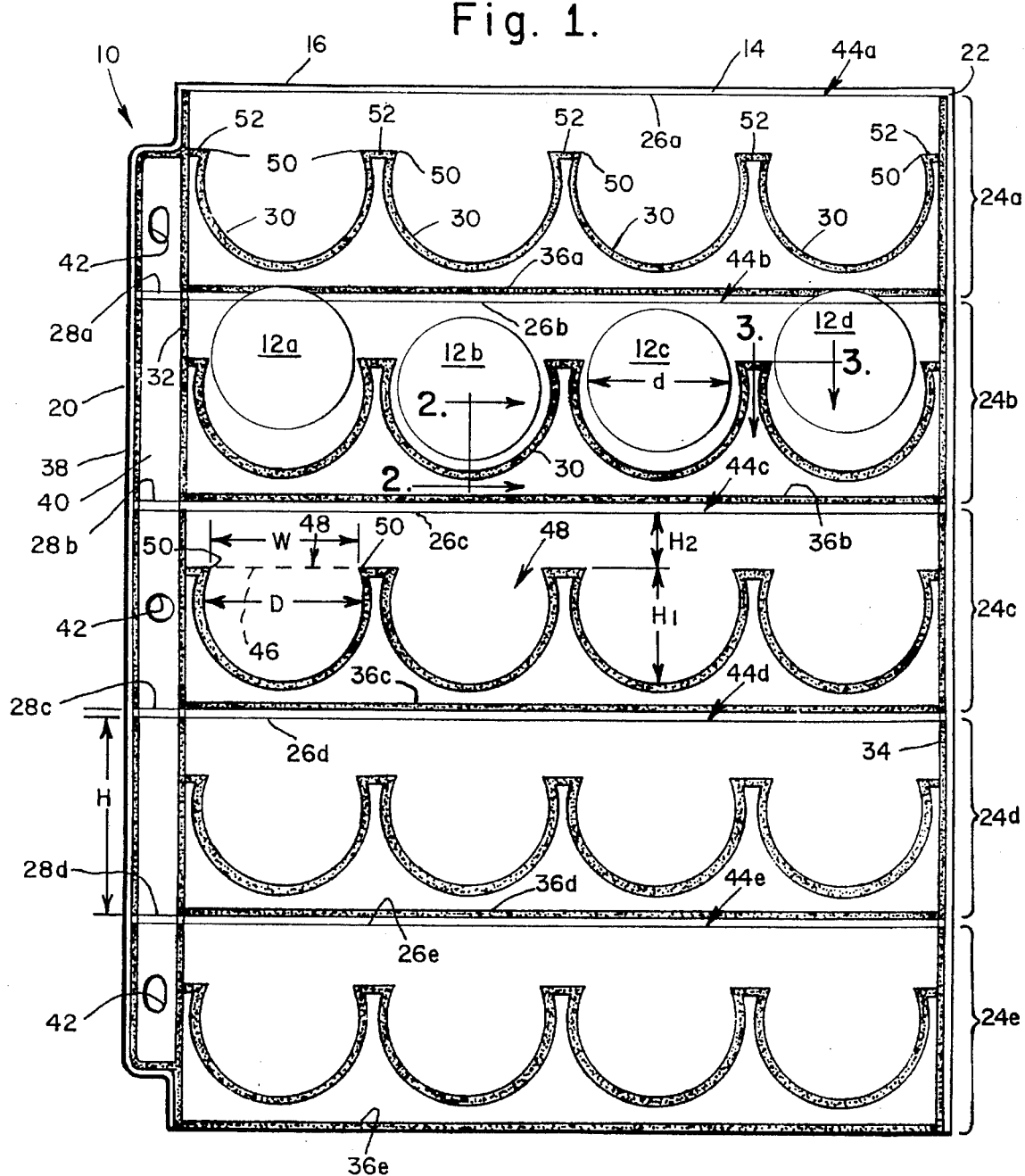
FIG. 1 is a front elevation view of a preferred embodiment of an album leaf according to the present invention, shown with a plurality of milk caps for illustrating the manner of use of such album page.
Figure 2:
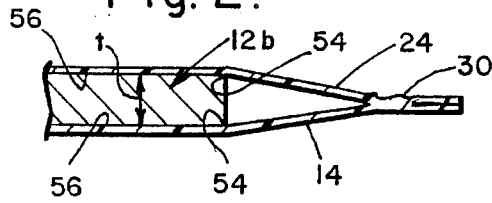
FIG. 2 is a fragmentary cross-sectional view of an arcuate seam of the album leaf of FIG. 1, with a contained milk cap, taken along the line 2—2 of FIG. 1 in the direction of the appended arrows.
Figure 3:
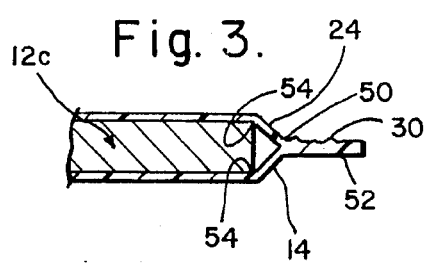
FIG. 3 is a fragmentary cross-sectional view of the album leaf of FIG. 1, at the opening to the arcuate seam during insertion or withdrawal of a milk cap, taken along the line 3—3 of FIG. 1 in the direction of the appended arrows.

Considering FIGS. 1, 2 and 3 together, there is illustrated a preferred embodiment of an album leaf 10 for protectively storing and displaying a plurality of disks 12 and in particular a plurality of milk caps 12, represented by the four disks or milk caps 12a, 12b, 12c, 12d, each having a diameter d and a thickness t. The album leaf 10 includes a substantially rectangular, flexible plastic sheet or panel 14 having an upper edge 16, a lower edge 18, a left edge 20 and a right edge 22, as viewed in FIG. 1. Superposed on the first sheet 14 are five strips 24 or second substantially rectangular, flexible plastic sheets or panels 24a, 24b, 24c, 24d, 24e, each having a height H slightly less than one-fifth the height of the first panel 14, and each having a width substantially equal to the width of the first panel 14. Each of the second panels 24 is directly superposed on the first panel 14, and the second panels 24 are arranged such that their respective left edges are aligned with the left edge 20 of the first panel 14 and their respective right edges are aligned with the right edge 22 of the first panel 14. As viewed in FIG. 1, the uppermost second panel 24a is superposed on the first panel 14 with the upper edge 26a of the second panel 14a parallel to and slightly lower than the upper edge 16 of the first panel 14; the upper edge 26b of the second panel 24b is parallel to and slightly lower than the lower edge 28a of the uppermost second panel 24a; the upper edge 26c of the second panel 24c is parallel to and slightly lower than the lower edge 28b of the second panel 24b; the upper edge 26d of the second panel 24d is parallel to and slightly lower than the lower edge 28c of the second panel 24c; and the upper edge 26e of the lowermost second panel 24e is parallel to and slightly lower than the lower edge 28d of the second panel 24d, with the lower edge 28e of the lowermost second panel 24e being aligned with the lower edge 18 of the first panel 14.

The second panels 24 are each secured to the first panel 14 in superposed relation, arranged as described above, by means at least of a plurality of arcuate seams 30. Preferably, the panels 14, 24 are further secured together in such relation by a seam pattern which includes, as viewed in FIG. 1, a left vertical seam 32 and a right vertical seam 34 extending from the leaf's upper edge 16 to its lower edge 18, horizontal seams 36a, 36b, 36c, 36d, 36e extending between the vertical seams 32, 34 and along the lower edges 28a, 28b, 28c, 28d, 28e of the respective second panels 24a, 24b, 24c, 24d, 24e. A seam 38 is preferably provided along the leaf's left edge 20, for providing a tab or margin 40 in which apertures 42 may be cut for permitting the leaf 10 to be retained by correspondingly positioned rings of a loose-leaf binder or album.

The first and second panels 14, 24 are preferably of a thermoplastic sheet material, i.e. a plastic sheet material which is susceptible to thermo-adhesive welding techniques for securing the superposed panels 14, 24 by means of the seams 30, 32, 34, 36, 38 having been formed by thermo-contact or radio-frequency welding techniques. One example of such thermoplastic sheet material is polyvinyl chloride, or vinyl, whereby the seams sealing the panels together may be produced by well known radio-frequency welding techniques. A preferred example of a thermoplastic sheet material is a polyolefin such as polypropylene, which material is substantially chemically inert so as not to react with dyes and other surface components of milk caps, and is physically resistant to extreme heat and cold. Utilizing polypropylene sheet material for the first and second panels 14 and 24, the seams 30, 32, 34, 36, 38 may be produced by thermocontact welding techniques such as taught by U.S. patent application Ser. No. 07/666,260, now U.S. Pat. No. 5,266,150, of William R. Miller, titled "Thermocontact Welding Method and Apparatus, and Welded Product", filed Mar. 8, 1991, now U.S. Pat. No. 5,266,150, which patent is incorporated herein by this reference. In one suitable example of the album leaf 10, the thickness of each of the polypropylene panels 14, 24a, 24b, 24c, 24d, 24e was approximately 120 microns, although flexible sheets of other thermoplastic materials and/or having other thicknesses may be employed. Further, it is preferred that either the first panel 14 or the second panels 24 be transparent, or alternatively that both the first panel 14 and the second panels 24 be transparent, so that at least one surface of each of the milk caps 12 may be viewed when contained between the panels 14, 24 of the album leaf 10.

The second panels 24a, 24b, 24c, 24d, 24e are secured to the first panel 14 such that the respective upper edges 26a, 26b, 26c, 26d, 26e of the second panels 24 between the vertical seams 32, 34 are unsealed, providing respective openings 44a, 44b, 44c, 44d, 44e between the first panel 14 and the respective second panels 24 for receiving the disks 12 between the first panel 14 and a second panel 24, for example as illustrated by the disk 12a shown in FIG. 1.

The arcuate seams 30 sealing a second panel 24 to the first panel 14 are horizontally arranged along the second panel 24. Each arcuate seam 30 describes a circular arc for containing at least one-half (preferably more than one-half) but not the entirety of a disk 12 between the superposed panels 14, 24 within the arc of the arcuate seam 30. The arc of each of the arcuate seams 30 exceeds 180° and terminates at a horizontal chord 46 (shown in phantom in FIG. 1), i.e. the chord 46 being substantially parallel to the second panel's upper edge 26. The termination of the arcuate seam 30 (i.e. at the chord 46) provides each arcuate seam 30 with a second opening 48 between the superposed panels 14, 24 of sufficient width W (i.e. between the arcuate seam's termini 50) for permitting passage through the second opening 48 and into the arc of a seam 30 of at least one-half (and preferably more than one half) of a disk 12 when the disk 12 is received by the first opening 26, for example as illustrated by the disks 12a and 12b in FIG. 1. The height H of each of the second panels 24 is sufficiently great that the entirety of the disk 12 is contained between the superposed panels 14, 24 when the disk 12 is normally situated within the arc of the seam 30, as illustrated by the disks 12b and 12c of FIG. 1.

The arcuate seams 30 preferably terminate with reinforcing welds such as the horizontal seams 52 which, if situated between adjacent arcuate seams 30, may connect adjacent termini 50 thereof.

The inside diameter D of each arcuate seam 30 is slightly greater than the diameter d of a disk or milk cap 12. When a milk cap 12 has been inserted into an arcuate seam 30 between the first panel 14 and a second panel 24 and then released by the person inserting the milk cap, the milk cap 12 is automatically positioned concentrically within the arcuate seam 30, as illustrated by the milk cap 12b in FIG. 1. Such self-positioning of the milk caps 12 appears to be in reaction to forces exerted by the somewhat elastic first and second panels 14, 24 upon the circumferential intersections 54 of the milk cap's respective sides 56 with its edge 58 as the two panels 14, 24 inwardly of the arcuate seam 30 are forced apart in consequence of the thickness t of the inserted disk 12, as illustrated in FIG. 2.

The width W of each arcuate seam opening 48 (i.e., the length of the chord 46) and the inside diameter D of an arcuate seam 30 are related to the diameter d and thickness t of a disk or milk cap 12 such that the milk cap 12 resists withdrawal from within the arcuate seam 30 through the second opening 48 when at least one-half of the milk cap 12 is contained within the arc of the seam 30. For examples of the preferred embodiment of the album leaf 10 described herein, it has been observed that a milk cap 12 which has been received by an arcuate seam 30 (see milk cap 12b of FIG. 1) resists withdrawal from within the arc even when the leaf 10 is turned upside-down and vigorously shaken, in which event the milk cap 12 became situated within the arcuate seam 30 as represented by the milk cap 12c of FIG.

1, remaining entirely contained between the first and second panels 14, 24.

When a milk cap 12 is to be intentionally removed from between the panels 14, 24 of the leaf 10, such as when a milk cap 12 is grasped by a person's fingers and outwardly urged (upwardly as viewed in FIG. 1) for being withdrawn as represented by the milk cap 12d of FIG. 1, the milk cap's position of greatest resistance to withdrawal is when its diameter d is aligned with the chord 46 for passage through the second opening 48. This condition is represented in greater detail in FIG. 3, wherein it may be appreciated that the magnitude of the forces exerted upon the circumferential intersections 54 of the milk cap's respective sides 56 with its edge 58—in consequence of the thickness t of the milk cap 12c and the elasticity of the panels 14, 24 inwardly of the arcuate seam's termini 50—is at a maximum. The magnitude of such drag forces when the disk is in its normal position within the arcuate seam 30 and entirely between the first and second panels 14, 24, as represented by milk caps 12b and 12c in FIG. 1, is of course less than the maximum forces exerted during intentional withdrawal. Nevertheless, the dimensions of the width W of the second opening 48 and the inside diameter D of the arcuate seam 30 in relation to the diameter d and thickness t of the milk cap 12, present forces which are sufficient for normally maintaining the milk cap 12 entirely contained between the first panel 14 and a second panel 24, and for causing the milk cap 12 to resist withdrawal through the second opening 48, when at least one-half of the milk cap is contained within the arc of the arcuate seam 30.

It is thought that other forces resulting from the relationships discussed above may be involved in causing the disk to resist withdrawal from within the arcuate seam 30, such as drag forces provided by surface contact between the panels 14,24 and the two sides 56 of the milk cap 12, and perhaps by a tendency for air pressure within the arc of the arcuate seam 30 to decrease, as the milk cap 12 is outwardly urged from its normal position within the arc of the seam 30.

In one suitable example of an album leaf 10 fabricated of transparent 120 micron polypropylene panels 14, 24 for containing milk caps 12 of 1⅝ inch diameter d and ³⁄₆₄ inch thickness t, each second panel 24 had a width between vertical seams 32, 34 of approximately 8¼ inches and a height H of approximately 2⅛ inches, and the second panels 24 were superposed on the first panel 14 with a vertical separation between respective edges 28, 26 of vertically adjacent second panels 24 of approximately ⅛ inch. The 2⅛ inch height H of a second panel 24 allowed for a vertical or perpendicular distance of approximately ⅝ inch between the chord 46 and the second panel's upper edge 26, although it was observed for this album leaf example that this perpendicular distance could be reduced to approximately ½ inch with satisfactory results. The arc of each arcuate seam 30 was approximately 230°, the inside diameter D of the arc of each arcuate seam 30 was approximately 1¹³⁄₁₆ inches, and the width W of the second opening 48 or chord 46 (between the termini 50 of an arcuate seam 30) was approximately 1¹¹⁄₁₆ inches.

It may be observed for this example of the preferred album page 10, that the width W of the second opening 48 was greater than the diameter d of a milk cap 12 by a distance of approximately 4/3 times the thickness t of the milk cap 12, although it would appear that satisfactory results would be achieved for widths W of the second opening 48 greater than the diameter d of a milk cap 12 by a distance of approximately the thickess t of the milk cap 12 and through a range exceeding 4/3 the thickness t. It may be similarly observed that the difference between the inside diameter D of the arc of an arcuate seam 30 and the diameter d of a milk cap 12 was approximately four times the thickness t of the milk cap 12.

Thus there has been described a device for protectively storing collectible disks, and in particular a plastic album leaf for protectively storing and displaying milk caps. Other embodiments of the invention and other configurations of the embodiment presented herein may be developed without departing from the essential characteristics thereof. Accordingly, the invention should be limited only by the scope of the claims listed below.

I claim:

1. A device for protecting a disk, comprising in combination:

a disk;

two flexible plastic panels in superposed relation; and securing means securing said panels in said superposed relation with a first opening for receiving said disk between said panels, said securing means including an arcuate seam sealing said superposed panels along a circular arc for containing at least one-half but not the entirety of said disk between said panels within said arc of said seam, said arc of said seam exceeding 180° and terminating at a second opening between said superposed panels of sufficient width for permitting passage therethrough and into said arc of at least one-half of said disk when said disk is received by said first opening for containing the entirety of said disk between said panels, the width of said second opening and the inside diameter of said arcuate seam being related to the diameter and the thickness of said disk such that said disk resists withdrawal from within said arc of said seam through said second opening when at least one-half of said disk is contained within said arc.

2. The device according to claim 1, wherein:

the width of said second opening is greater than the diameter of said disk by a distance for increasing drag force on said disk by said superposed panels as said disk is outwardly urged while at least one-half of said disk is contained within said arc.

3. The device according to claim 1, wherein:

the width of said second opening is greater than the diameter of said disk by a distance of approximately the thickness of said disk.

4. The device according to claim 1, wherein:

the inside diameter of said arcuate seam is greater than the diameter of said disk by a distance of approximately four times the thickness of said disk.

5. The device according to claim 1, wherein:

said arc of said seam is at least approximately 230°.

6. A device for containing a plurality of disks, comprising in combination:

a plurality of disks;

a first flexible plastic panel;

at least one second flexible plastic panel; and securing means securing each said at least one second panel to said first panel in superposed relation with an edge of said at least one second panel providing a first opening between said first panel and said at least one second panel for receiving said disks, said securing means including at least one arcuate seam sealing said at least one second panel to said first panel, said at least one seam describing a circular arc for containing at least one-half but not the entirety of a one of said disks between said first panel and said at least one second panel within said arc of said seam, said arc of said seam exceeding 180° and terminating at a second opening between said first panel and said one second panel of sufficient width for permitting passage therethrough and into said arc of at least one-half of said one of said disks when said one of said disks is received by said first opening for containing the entirety of said one of said disks between said superposed panels, the width of said second opening and the inside diameter of said arcuate seam being related to the diameter and the thickness of said one of said disks such that said one of said disks resists withdrawal from within said arc of said seam through said second opening when at least one-half of said one of said disks is contained within said arc.

7. The device according to claim 6, wherein:

the width of said second opening is greater than the diameter of said one of said disks by a distance for increasing drag force one said on of said disks by said superposed panels as said one of said disks is outwardly urged while at least one-half of said one of said disks is contained within said arc.

8. The device according to claim 6, wherein:

the width of said second opening is greater than the diameter of said one of said disks by a distance of approximately the thickness of said one of said disks.

9. The device according to claim 6, wherein:

the inside diameter of said arcuate seam is greater than the diameter of said one of said disks by a distance of approximately four times the thickness of said one of said disks.

10. The device according to claim 6, wherein:

said arc of said seam is at least approximately 230°.

11. In an album leaf for containing a plurality of disks, the combination comprising:

a plurality of disks;

a first flexible plastic panel;

a second flexible plastic panel superposed on said first panel with an edge of said second panel providing a first opening between said superposed panels for receiving ones of said disks; and a plurality of arcuate seams sealing said superposed first and second panels together, each seam of said plurality describing a circular arc for containing at least one-half but not the entirety of a one of said disks between said superposed panels within said arc of said seam, said arc of said seam exceeding 180° and terminating at a second opening between said superposed panels having a width for permitting passage therethrough of at least one-half of said one of said disks when said one of said disks is received by said first opening for containing the entirety of said one of said disks between said superposed panels, the width of said second opening and the inside diameter of said arcuate seam being related to the diameter and thickness of said one of said disk such that said one of said disks resists withdrawal from within said arc of said seam through said second opening when at least one-half of said one of said disks is contained within said arc.

12. The album leaf according to claim 11, wherein:

the width of said second opening is greater than the diameter of said one of said disks by a distance of approximately the thickness of said one of said disks.

13. The album leaf according to claim 11, wherein:

the inside diameter of said arcuate seam is greater than the diameter of said one of said disks by a distance of approximately four times the thickness of said one of said disks.

14. The album leaf according to claim 11, wherein:

said arc of said seam is at least approximately 230°.

15. The album leaf according to claim 14, wherein:

the width of said second opening is greater than the diameter of said one of said disks by a distance of approximately 4/3 times the thickness of said one of said disks.

16. The album leaf according to claim 11, wherein:

said disks have a diameter of approximately 1⅝ inches and a thickness of approximately 3/64 inch; and the inside diameter of said arcuate seam is approximately 1¹³⁄₁₆ inches and the width of said second opening is approximately 1¹¹⁄₁₆ inches.

17. The album leaf according to claim 16, wherein:

said arc of said seam is approximately 230°.

18. The album leaf according to claim 16, wherein:

said second opening is substantially parallel to said edge and the perpendicular distance between said second opening and said edge is at least approximately ½ inch.

19. An album leaf for containing a plurality of disks, comprising in combination:

a plurality of disks;

a first substantially rectangular flexible plastic panel;

a plurality of second substantially rectangular flexible plastic panels; and securing means securing said second panels respectively to said first panel in superposed relation with an edge of each said second panel providing a first opening between said first panel and each said second panel for receiving said disks, said securing means including a plurality of arcuate seams sealing said second panels to said first panel in said superposed relation, each said arcuate seam describing a circular arc for containing at least one-half but not the the entirety of a one of said disks between said first and a one of said superposed second panels within said arc of said seam, said arc of said seam exceeding 180° and terminating at a second opening between said first panel and said one superposed second panel, said second opening having a width for permitting passage therethrough and into said arc of at least one-half of said one of said disks when said one of said disks is received by said first opening between said first panel and said one superposed second panel for containing the entirety of said disks between said first panel and said one of said superposed second panel, the width of said second opening and the inside diameter of said arcuate seam being related to the diameter and thickness of said one of said disks such that said one of said disks resists withdrawal from within said arc of said seam through said second opening when at least one-half of said one of said disks is contained within said arc.

20. The album leaf according to claim 19, wherein:

said second opening extends along a chord across the termini of said arc and substantially parallel to said edge of said one superposed second panel.

21. The album leaf according to claim 19, wherein:

the width of said second opening is greater than the diameter of said one of said disks by a distance of approximately the thickness of said one of said disks.

22. The album leaf according to claim 19, wherein:

the inside diameter of said arcuate seam is greater than the diameter of said one of said disks by a distance of approximately four times the thickness of said one of said disks.

23. The album leaf according to claim 14, wherein:

said arc of said seam is approximately 230°.

24. The album leaf according to claim 19, wherein:

the width of said second opening is greater than the diameter of said one of said disks by a distance of approxiimately 4/3 times the thickness of said one of said disks.

25. The album leaf according to claim 19, wherein:

said disks have a diameter of approximately 1 5/8 inches and a thickness of approximately 3/64 inch; and the inside diameter of said arcuate seam is approximately 1 13/16 inches and the width of said second opening is approximately 1 11/16 inches.

26. The album leaf according to claim 25, wherein:

said arc of said seam is at least approximately 230°.

27. The album leaf according to claim 25, wherein:

said second opening extends along a chord across the termini of said arc of said seam and substantially parallel to said edge of said one superposed second panel; and the perpendicular distance between said chord and said edge is at least approximately 1/2 inch.

28. The album leaf according to claim 27, wherein:

said arc of said seam is approximately 230°.

* * * * *